United States Patent [19]
Faulkner

[11] Patent Number: 5,839,355
[45] Date of Patent: Nov. 24, 1998

[54] FRYER WITH COOKING MEDIUM LOSS PROTECTION AND ASSOCIATED METHODS OF PROTECTING FRYERS

[76] Inventor: Harold E. Faulkner, 10211 Vinemont St., Dallas, Tex. 75218

[21] Appl. No.: 740,960

[22] Filed: Nov. 5, 1996

[51] Int. Cl.⁶ .............................. A47J 27/00; A23L 27/00
[52] U.S. Cl. ................................ 99/330; 99/333; 99/331; 426/438
[58] Field of Search ............................ 99/325, 331, 332, 99/333, 403, 330; 219/494, 497; 426/438, 520

[56] References Cited

U.S. PATENT DOCUMENTS

| | | | |
|---|---|---|---|
| 4,278,872 | 7/1981 | Koether et al. | 219/497 |
| 4,742,455 | 5/1988 | Schreyer | 364/400 |
| 4,812,625 | 3/1989 | Ceste, Sr. | 219/497 |
| 4,913,038 | 4/1990 | Burkett et al. | 99/331 |
| 5,026,969 | 6/1991 | Knepler et al. | 99/330 X |
| 5,038,676 | 8/1991 | Davis et al. | 99/330 |
| 5,090,305 | 2/1992 | Lehman | 99/330 |
| 5,186,097 | 2/1993 | Vaseloff et al. | 99/330 |
| 5,352,866 | 10/1994 | Cartwright et al. | 219/497 |
| 5,398,597 | 3/1995 | Jones et al. | 99/330 |
| 5,490,449 | 2/1996 | Meister et al. | 99/330 |
| 5,544,567 | 8/1996 | Davis et al. | 99/336 |
| 5,575,194 | 11/1996 | Maher, Jr. et al. | 99/330 |

*Primary Examiner*—Reginald L. Alexander
*Attorney, Agent, or Firm*—Konneker & Smith, P.C.

[57] ABSTRACT

A fryer having protection against loss of contact between cooking medium and the fryer's heat exchanger provides reduced risk of fire in the fryer's vat. In a preferred embodiment, a fryer has an electronic thermostat which regulates the temperature of the heat exchanger in a unique manner to thereby prevent the heat exchanger temperature from reaching a hazardous level. Associated methods of protecting fryers are also provided.

4 Claims, 2 Drawing Sheets

FRYER WITH COOKING MEDIUM LOSS PROTECTION AND ASSOCIATED METHODS OF PROTECTING FRYERS

BACKGROUND OF THE INVENTION

The present invention relates generally to fryers which utilize a cooking medium heated to an elevated temperature to fry foods and, in a preferred embodiment thereof, more particularly provides a fryer protected against loss of the cooking medium and associated methods of protecting fryers.

Generally, in large commercial operations, foods, such as chicken, are fried by immersing the foods in a cooking medium. Typically, the cooking medium is shortening, which has been melted and further heated to an elevated temperature in a vat of a commercial fryer. The vat usually has a heating element disposed in a lower portion thereof, beneath a rack which prevents bits of cooking food from dropping to the bottom of the vat, or on which baskets of food are placed to be cooked.

Periodically, the vat must be cleaned, and the cooking medium must be drained from the vat and filtered or replaced. A drain valve is commonly provided on the vat for this purpose. To replace or filter the cooking medium, the heating element is deactivated, the vat is drained by opening the drain valve while the cooking medium is still in its liquid state, the drain valve is closed, new or filtered cooking medium is placed in the vat, and the heating element is reactivated to melt the new or filtered cooking medium and raise its temperature to that suitable for frying the food. Where cooking medium that is liquid at ambient temperature, such as oil, is utilized, the procedure is similar, except that it is not necessary to melt the cooking medium, and it is not necessary to drain the cooking medium before it solidifies.

While the procedure detailed above seems relatively uncomplicated, in many instances it has been improperly performed, resulting in fires initiated in fryers that may damage the fryers and endanger the buildings in which the fryers are housed. One estimate is that there is more than one fire per week in commercial fryers.

The cause of these fires is usually that the cooking medium is not in intimate contact with the heating element when the heating element is reactivated after the cooking medium has been replaced in the vat. In some instances, the cooking medium is not even replaced in the vat before the heating element is reactivated. When the heating element is reactivated and is not in intimate contact over substantially all of its external surface with the cooking medium, all or a portion of its external surface may attain the ignition point of the cooking medium, thereby causing cooking medium residue in the vat, cooking medium residue on the surface of the heating element, or replaced cooking medium, to ignite when it contacts the heating element.

This problem is well known in the art and several solutions have been proposed in the past to prevent these fires. Unfortunately, none of the heretofore proposed solutions have been entirely satisfactory.

One proposed solution is to attach a switch to the drain handle. In this manner, the open or closed position of the drain handle may be sensed by the switch and communicated to a control circuit which controls activation of the heating element. The heating element is prevented from being activated when the drain valve is open, indicating that the vat contains no cooking medium.

The switch, however, does not indicate to the control circuit whether or not cooking medium has been replaced in the vat after the drain handle has been closed. Thus, the control circuit permits the heating element to be reactivated when the drain valve has been closed, but there is no cooking medium in the vat. This solution, therefore, does not satisfactorily prevent a fire in the vat.

Another proposed solution is to install a pushbutton switch in the fryer element control circuit. The pushbutton must be depressed by the fryer operator before the control circuit is permitted to activate the heating element. Typically, the pushbutton is provided with a legend which inquires of the operator whether the cooking medium has been replaced in the vat. In this manner, the operator is required to take positive action to indicate to the control circuit that the cooking medium has been replaced, before the control circuit will permit the heating element to be activated.

Unfortunately, this solution has also proved to be unsatisfactory, for several reasons. First, it is easily circumvented by operators with only limited knowledge of electrical circuits. Second, it is often viewed by some operators as simply one more step that must be performed to turn on the fryer, and they may not be cognizant of the importance of answering the inquiry correctly when the pushbutton is depressed. Third, it does not solve the problem when the cooking medium has been replaced in the vat, but, for some other reason, still is not in intimate contact with the heating element.

One reason that the cooking medium may not be in intimate contact with the heating element, even though it has been placed in the vat, is that it has not been pressed firmly around the heating element. This situation occurs frequently when a semi-solid cooking medium, such as shortening, is used in the fryer. Since the shortening does not flow at ambient temperature, it must be physically forced into contact with the external surface of the heating element. Particularly when there is a wire rack disposed above the heating element, and the rack is not removed when the shortening is placed about the heating element, it is quite easy to leave voids where there is no contact between the cooking medium and the heating element.

Another reason that the cooking medium may not be in intimate contact with the heating element is that, even though the shortening may have been placed in intimate contact with the heating element initially, when the heating element begins to melt the shortening, it may drain away from the heating element, leaving portions of the external surface of the heating element exposed.

One solution that has been proposed to solve this problem is to separately melt the shortening on a range, and then pour the melted shortening into the vat before turning the fryer on and activating the heating element. It may be easily seen, however, that this method is quite hazardous to the operator who must carry the hot shortening from the range to the fryer and pour the shortening into the vat.

Another solution is to provide an initial melt cycle for the control circuit. Typically, this is accomplished by programming a conventional ROM chip within the control circuit, which is suitably interconnected to a microprocessor or processor portion of a single chip computer. The program, for example, may cycle the heating element so that it is alternately on for fifteen seconds and off for fifteen seconds, until the shortening reaches approximately 125° F., at which point the shortening is melted and the heating element is permitted to be activated continuously. However, this solution does not address the problem where the cooking medium has not been replaced in the vat.

Additionally, many fryers and control circuits for fryers have been devised, wherein the temperature of the cooking medium is precisely controlled by, for example, microprocessors and programmed computer chips, wherein the cooking medium temperature is automatically adjusted in response to the need to cook various types of foods, etc. Typically, the control circuits utilize a temperature sensor immersed in the cooking medium. One example of such a fryer and control circuit is that disclosed in U.S. Pat. No. 5,186,097 to Vaseloff et al. However, since these various control circuits are dependent upon sensing the temperature of the cooking medium, they are not effective to prevent fires due to absence of cooking medium on the heating element external surface.

From the foregoing, it can be seen that it would be quite desirable to provide a fryer which is protected against loss of contact between its heating element and cooking medium used in the fryer. Additionally, it would be quite desirable to provide a control circuit which may be retrofit to an existing fryer, so that the existing fryer has enhanced protection against fires therein. It is accordingly an object of the present invention to provide such a fryer, control circuit, and associated methods of protecting fryers against loss of cooking medium contact with the external surface of the heating element.

SUMMARY OF THE INVENTION

In carrying out the principles of the present invention, in accordance with an embodiment thereof, a fryer is provided which includes a control circuit which protects the fryer from hazardous conditions resulting from a heat source of the fryer being heated to a temperature greater than a smoking, flash-point or ignition temperature (hereinafter, the "burning" temperature) of a cooking medium used in the fryer. The control circuit, upon activation of the fryer, senses the temperature of the cooking medium and, depending on that cooking medium temperature, controls heating of the heat source.

In broad terms, a fryer control circuit is provided for a fryer of the type having a heat source capable of elevating a temperature of a cooking medium. The fryer further has a vat for containment of the cooking medium and a temperature probe for indicating the temperature of the cooking medium. The control circuit includes a signal generating means and a driving means.

The signal generating means generates a signal for a predetermined initial time period when the temperature indicated by the probe is less than an upper limit temperature. The upper limit temperature is greater than a melting temperature of the cooking medium and less than a burning temperature of the cooking medium. Thus, when the temperature indicated by the probe is less than the upper limit temperature, the control circuit enters a fryer protection mode.

The driving means is interconnected to the signal generating means. It drives the heat source to elevate the temperature of the cooking medium in response to the signal generated by the signal generating means.

Also provided is a fryer of the type wherein food is immersed in a cooking medium heated to an elevated cooking temperature. The cooking medium is heated to the elevated cooking temperature after the fryer has been activated by connecting the fryer to an external power source. The fryer includes a vat, a heat source, a temperature probe and a control circuit.

The vat is generally box-shaped and the heat source and temperature probe are each disposed at least partially within the vat. The control circuit is interconnected to the temperature probe. The control circuit has a fryer protection mode wherein the control circuit is capable of elevating a temperature of the heat source to a temperature less than a temperature at which the cooking medium burns, in response to activation of the fryer.

A method is also provided for protecting a fryer from combustion of cooking medium contained within a vat of the fryer. The fryer is of the type having a heat source and a temperature probe disposed within the vat, the temperature probe being capable of sensing a temperature of the cooking medium, and the heat source being capable of elevating a surface temperature of the heat source to thereby elevate the cooking medium temperature.

The method includes the steps of sensing temperature within the vat utilizing the temperature probe; and elevating the surface temperature of the heat source by activating the heat source for a preselected initial time period when the vat temperature sensed by the temperature probe is less than a predetermined temperature. The predetermined temperature is greater than a melting temperature of the cooking medium and less than a burning temperature of the cooking medium.

DETAILED DESCRIPTION

Figure 1:
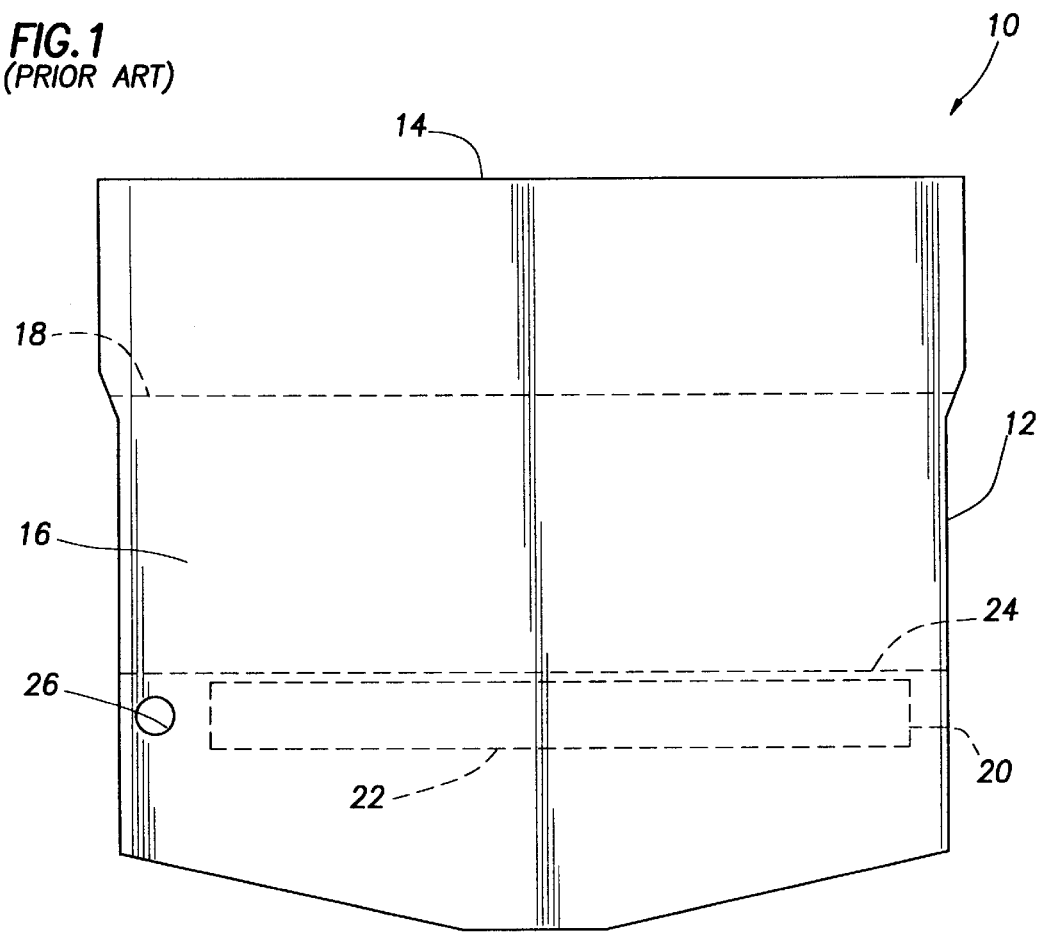
FIG. 1 (PRIOR ART) is a front view of a typical fryer.

Illustrated in FIG. 1 (PRIOR ART) is a fryer 10 which is utilized to fry foods in large commercial operations. The fryer 10 includes a generally box-shaped vat 12 which is open at its top side 14 so that food may be immersed in cooking medium 16 contained within the vat. A dashed line 18 indicates a typical level of the cooking medium 16 in the vat.

The cooking medium 16 may be shortening, oil, or any other substance suitable for immersion of food therein for frying of the food. Usually, the cooking medium 16 is heated to an elevated temperature, for example, if the cooking medium is shortening, it is heated to approximately 360° F. for frying french fried potatoes, or to approximately 330°–370° F. for frying chicken or other foods. Where the cooking medium 16 is shortening, it melts at approximately 100° F. and begins to smoke (and potentially burn) at somewhat higher than 500° F. It may, thus, be seen that a relatively narrow range of temperature of the cooking medium 16 should be maintained within the vat 12.

For heating the cooking medium 16, the fryer 10 includes a heat exchanger 20. The heat exchanger 20 is typically disposed in a lower portion of the vat 12, so that it is immersed in the cooking medium 16 when the cooking medium is in its liquid state. It will be readily appreciated, however, that if the cooking medium 16 is in a solid state (for example, if the cooking medium is shortening and its temperature is less than approximately 100° F.), the heat exchanger 20 may not be completely surrounded by the cooking medium, even though enough of the cooking medium is present in the vat for the cooking medium to reach the level 18 when it is melted. For this reason, an exterior surface 22 of the heat exchanger 20 may be exposed to air when the heat exchanger is heated in an effort to, in turn, heat the cooking medium 16.

If a portion of the heat exchanger exterior surface 22 is left exposed to air when the heat exchanger 20 is heated, that portion of the exterior surface may attain a temperature equal to, or greater than, the ignition point of the cooking medium 16. Thereafter, if the cooking medium 16 contacts that portion of the exterior surface 22, it may ignite and result in a fire within the vat 12.

Note that the fryer 10 described herein includes the heat exchanger 20 which is, representatively, of the type heated by combusted gas, but it is to be understood that an electrical heater element, electrically heated heat exchanger, etc. may be substituted for the heat exchanger 20 with the same or similar results. In essence, in a typical fryer 10, absence of contact between the cooking medium 16 and the heat exchanger 20 or heating element, which is designed to be immersed in the cooking medium while transferring heat thereto, is a potential cause of fire in the fryer.

The heat exchanger 20 is disposed within the vat 12 immediately below a rack 24 that prevents cooking food, such as chicken, from dropping to the bottom of the vat, or on which baskets (not shown) of food may be rested while the food is being fried. Some fryers do not include the rack 24 as their baskets are designed to be suspended from the top side 14 of the vat 12. Nevertheless, many fryers do include the rack 24, which makes it difficult to achieve intimate contact between the cooking medium 16 and the exterior surface 22 of the heat exchanger 20 or heating element, without removing the rack if the cooking medium is in its solid state.

Many fryers, such as the fryer 10 illustrated in FIG. 1, also include an opening 26 formed through the vat 12 below the level 18. Usually, the opening 26 is utilized for insertion therethrough of a thermometer, temperature probe, etc. device (not shown in FIG. 1) for measuring the temperature of the cooking medium 16. Note that, if the cooking medium 16 is not in intimate contact with the heat exchanger 20, or simply is not present in the vat 12 (for example, if the cooking medium has been drained, but not replaced), the temperature sensing device will not accurately indicate the temperature of the cooking medium. Additionally, if the temperature sensing device were relied on to prevent smoking or burning of the cooking medium, it would not accurately indicate that the heat exchanger exterior surface 22 may be at a very elevated temperature that may burn the cooking medium when it does contact the exterior surface, or ignite residue on the exterior surface.

Figure 2A:
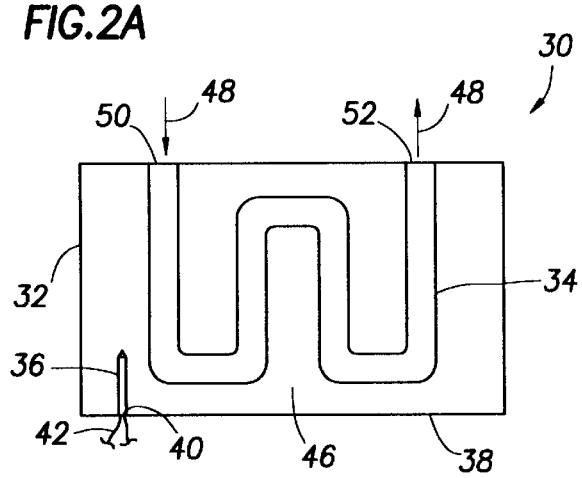
FIG. 2A is a top view of a heat exchanger and temperature probe incorporating principles of the present invention.

Referring additionally now to FIG. 2A, a top view is representatively illustrated of a fryer 30 embodying principles of the present invention. The fryer 30 includes a vat 32 similar to the vat 12, a heat exchanger 34 similar to the heat exchanger 20, and a temperature probe 36 operatively installed through an opening 40 similar to opening 26 formed through a front wall 38 of the vat. The temperature probe 36 includes leads 42 for interconnection of the temperature probe to a control circuit 44 described more fully hereinbelow.

The temperature probe 36 may be any of a variety of temperature sensing devices including, for example, thermistors, thermocouples, RTD's, etc. A person of ordinary skill in the art will readily appreciate that various temperature sensing devices may be substituted for the probe 36 according to the principles of the present invention. It is a benefit of the present invention that, when retrofit to existing fryers, such as the fryer 10, the temperature probe 36 may be conveniently installed in the existing opening 26.

As representatively illustrated in FIG. 2A, the probe 36 is positioned for measurement of the temperature of cooking medium 46 in the vat 32 at some distance from the heat exchanger 34. As will be more fully described hereinbelow, when configured as shown in FIG. 2A, the probe 36 is, thus, intended to measure the temperature of cooking medium 46 when it is in its liquid state. Of course, if the cooking medium 46 is in its solid state, and the probe 36 is contacting the cooking medium, the probe may also sense the temperature of the cooking medium in its solid state.

Figure 2B:
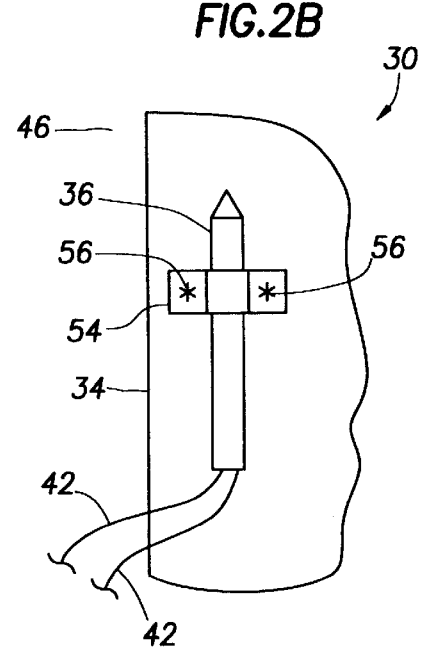
FIG. 2B is a view of an alternate attachment of the temperature probe proximate the heat exchanger of FIG. 2A.

Referring additionally now to FIG. 2B, a configuration is representatively illustrated in which the probe 36 is affixed proximate the heat exchanger 34. Note that the probe 36 is not attached directly to the heat exchanger 34, but is adjacent thereto, so that the probe is capable of sensing the temperature of the cooking medium 46 adjacent the heat exchanger 34.

The heat exchanger 34 representatively illustrated in FIG. 2A is of the type in which combusted gas 48 enters one end 50 of the heat exchanger, flows through the generally tubular heat exchanger, and exits another end 52 of the heat exchanger. It will, thus, be readily appreciated that end 50 will tend to be at a higher temperature than end 52, the gas 48 having transferred a portion of its heat to the heat exchanger 34 during its transit therethrough. Therefore, applicant prefers that, when configured as illustrated in FIG. 2B, the probe 36 be affixed adjacent the heat exchanger 34 at a position between ends 50 and 52 which is not so near end 50 that it is made to sense large temperature swings as the gas 48 is periodically flowed through the heat exchanger, but not so near end 52 that it is incapable of detecting the approximate temperature of the cooking medium 46 surrounding the remainder of the heat exchanger.

It will be readily appreciated by one of ordinary skill in the art that particular fryer dimensions, capacities, gas flow rates, heat exchanger lengths, etc. will affect the desired placement of the probe 36 relative to the heat exchanger 34 when the configuration shown in FIG. 2B is utilized. Nevertheless, minimal experimentation will be required by a person of ordinary skill in the art to satisfactorily position the probe 36 adjacent the heat exchanger 34 in a position such that the temperature of the cooking medium 46 adjacent the heat exchanger may be accurately sensed. Applicant prefers that the probe 36 be positioned adjacent the heat exchanger 34 so that the probe is capable of sensing the approximate median temperature of the cooking medium 46 adjacent the heat exchanger.

In the embodiment representatively illustrated in FIG. 2B, the probe 36 is affixed adjacent the heat exchanger 34 by use of a metal strap 54, which is attached by spot welds 56 to the heat exchanger. Applicant prefers that the temperature sensing portion of the probe 36 not directly contact the heat exchanger 34, so that the temperature of the cooking medium 46, and not the temperature of the heat exchanger 34, is sensed by the probe. For example, if the probe 36 contains a thermocouple, the juncture of the thermocouple (i.e., where the dissimilar metals are joined) is not directly contacting the heat exchanger 34. In an alternate embodiment of the present invention, however, the temperature sensing portion of the probe 36 may be in direct contact with the heat exchanger 34, for example, if it is desired to sense the temperature of the heat exchanger itself.

It is to be understood that, although the heat exchanger 34 is described herein as being of the type wherein combusted gas 48 is flowed therethrough, an electrically heated element or other method of heating the cooking medium 46 may be utilized in addition thereto, or in substitution therefor, without departing from the principles of the present invention.

Figure 3:
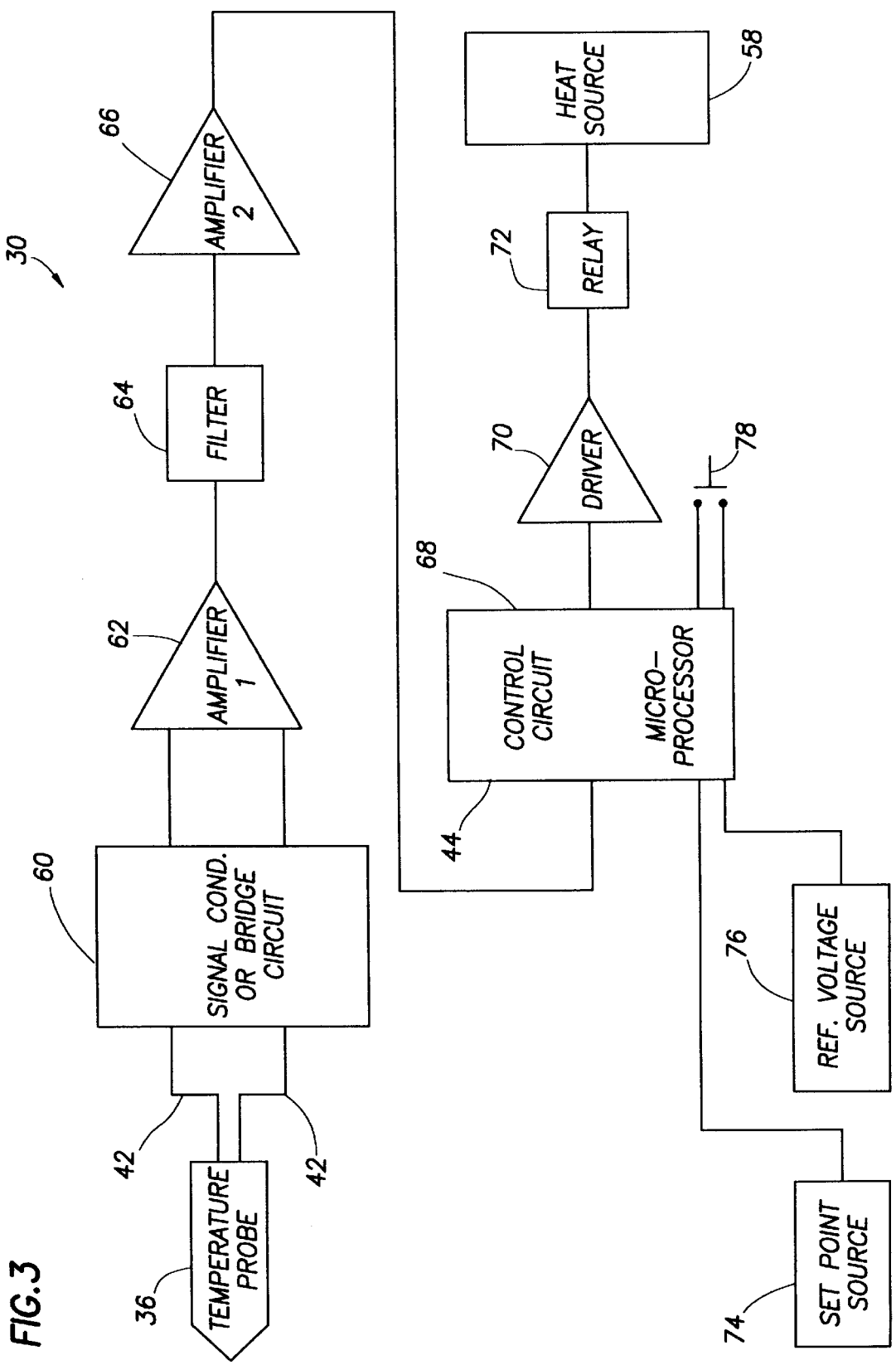
FIG. 3 is a block diagram of a control circuit incorporating principles of the present invention.

Referring additionally now to FIG. 3, a control circuit 44 is representatively illustrated. As shown in FIG. 3, the probe 36 is interconnected via the leads 42 to the control circuit 44, which is utilized to control a heat source 58 (e.g., the combusted gas 48) of the fryer 30. As used herein, the term "heat source" is intended to indicate any source of heat and associated components, which may be utilized to elevate the temperature of the cooking medium 46, for example, where the fryer 30 is of the gas-fired type, the heat source 58 may include the combusted gas 48 and heat exchanger 34, and, alternatively, where the fryer 30 is of the electrically-heated type, the heat source may include an electrical heating element, coil, etc. As described herein, the circuit 44 may be denominated an electronic thermostat, which provides protection against overheating of the heat exchanger 34 and, thus, prevents fire due to absence of contact between the cooking medium 46 and the heat exchanger.

The circuit 44 includes a conventional signal conditioner or bridge circuit 60, an amplifier 62, a filter 64, an amplifier 66, a microprocessor 68, a driver 70, a relay 72, a setpoint source 74, and a reference voltage source 76. It is to be understood that more, fewer, alternate, etc. elements may be utilized in the circuit 44 without departing from the principles of the present invention. Various elements of the circuit 44 may be powered by a conventional power source (e.g., a 5 and/or 12 volt power supply, not shown) which is activated when the fryer 30 is turned on.

Element 60, for example, may be a conventional signal conditioner when the temperature sensing portion of the probe 36 is a thermocouple, whereby the output voltage of the thermocouple is conditioned for input to the microprocessor 68. Alternatively, where the temperature sensing portion of the probe 36 is a thermistor or RTD, element 60 may be a conventional bridge circuit.

The amplifier 62 is utilized to adjust the signal level of the probe 36 output for use by the microprocessor 68. The filter 64 is utilized to eliminate any noise picked up by the probe leads 42. The amplifier 66 is utilized for impedance transformation.

The microprocessor 68 or microcomputer is preferably an integrated circuit which includes an analog-to digital converter and programmable ROM. The microprocessor converts the signal input from the probe 36, converts it to digital information, compares it to the setpoint input from the setpoint source 74, makes necessary calculations, and outputs an appropriate high or low (or "on" or "off") signal to the driver 70. The reference voltage source 76 outputs a reference voltage to the microprocessor 68 for use in the analog-to-digital conversion.

The setpoint source 74 inputs to the microprocessor 68 the temperature at which the fryer 30 is desired to cook the food. For example, for cooking chicken, the setpoint temperature may be 330°–370° F. The setpoint source 74 may be a conventional potentiometer, a set of dip switches, etc., and the setpoint temperature may be programmed directly into the microprocessor's memory (EEPROM). In a simple steady state mode of operation, the microprocessor 68 may send an "on" signal to the driver 70 when the temperature detected by the probe 36 is less than the setpoint temperature, and may send an "off" signal to the driver when the temperature detected by the probe is equal to, or greater than, the setpoint temperature. In more complex steady state modes of operation, the microprocessor 68 may alternatively send "on" and "off" signals to the driver 70 based on various algorithms, such as that disclosed in the U.S. Pat. No. 5,186,097 to Vaseloff et al. and others. It is to be understood that maintenance of the cooking medium 46 at a relatively constant cooking temperature, automatic variation of the cooking temperature to conform to various quantities or types of food to be cooked, etc., known to those skilled in the art and variations thereof, for maintaining or adjusting the cooking temperature of the cooking medium (i.e., the steady state mode of operation of the fryer 30) may be utilized in the present invention (e.g., by suitable programming of the microprocessor 68) without departing from the principles of the present invention.

When the driver 70 receives an "on" signal from the microprocessor 68, it drives the relay 72 to activate the heat source 58. If, for example, the fryer 30 has an electrical heating element serving as its heat source 58, when the relay 72 is switched "on", electrical current is caused to flow through the heating element. Alternatively, if the fryer 30 has the heat exchanger 34 as shown in FIGS. 2A & 2B, when the relay 72 is switched "on", the gas 48 is ignited and forced to flow through the heat exchanger.

In operation, when the fryer 30 is activated to heat the cooking medium 46, such as, when the fryer is turned on after the cooking medium has been replaced, the microprocessor 68 reads the temperature of the cooking medium as detected by the probe 36. The following further description of the fryer 30 operation gives representative times and temperatures, which the applicant prefers when shortening is used as the cooking medium 46, but it is to be clearly understood that various times, temperatures, and cooking mediums may be utilized without departing from the principles of the present invention.

If the temperature of the cooking medium 46 is greater than a predetermined upper limit, such as 325° F., upon activation of the fryer 30, a fryer protection mode, described more fully hereinbelow, is not entered. This upper limit is sufficiently greater than the melting point of the cooking medium 46 to ensure that all of the cooking medium is melted and, therefore, completely immerses the heat exchanger 34. Note that, if there is no cooking medium 46 present in the vat 32, the probe 36 will not indicate a temperature very much more or less than ambient. Thus, the upper limit should also be sufficiently greater than any expected ambient temperature, so that when the probe 36 indicates a temperature greater than the upper limit, it also indicates that cooking medium 46 is present.

If the probe 36 indicates a temperature of the cooking medium 46 greater than the upper limit, the microprocessor 68 may be programmed to enter the fryer's steady state mode. As described more fully hereinbelow, the fryer's steady state mode may maintain the temperature of the cooking medium 46 in a range suitable for cooking food therein, such as 330°–370° F. Note that the steady state mode of the fryer 30, and/or in particular the function of maintaining the temperature of the cooking medium 46 in a range suitable for cooking food therein, may be performed by a conventional thermostat or any of those control circuits known to those in the art, and it is not necessary for the microprocessor 68 to perform this function.

If, however, the probe 36 indicates a temperature of the cooking medium 46 equal to, or less than, the upper limit, the microprocessor 68 enters the fryer protection mode. It is desired for the microprocessor 68 to enter the fryer protection mode, since one cannot be assured that cooking medium 46 is present, or, if it is present, that it is in intimate contact with the heat exchanger 34. In the fryer protection mode, the microprocessor 68 runs a subroutine that causes an "on" signal to be sent to the driver 70 for a predetermined initial time period, which is sufficient to heat the heat exchanger 34 to a temperature (a "protection mode temperature") which is somewhat greater than the setpoint temperature, but safely less than the temperature at which the cooking medium 46 burns or smokes, and greater than the melting point of the cooking medium.

Where the heat exchanger 34 is a conventional gas-fired heat exchanger, the setpoint temperature is 330°–370° F., and the cooking medium 46 is shortening, applicant prefers that the initial time period is approximately 45 seconds. This initial time period will produce a surface temperature of the heat exchanger 34 of approximately 450° F., which is less than the temperature at which shortening burns or smokes, and is only somewhat greater than the setpoint temperature. Thus, if cooking medium 46 is present in the vat 32, the initial time period will be sufficient to bring the temperature of the heat exchanger 34 up to melt the cooking medium, so that the cooking medium will eventually be in intimate contact with the heat exchanger, without permitting the cooking medium to burn or smoke. If cooking medium 46 is not present in the vat 32 during the initial time period, but is added to the vat at some later time during the fryer protection mode, the temperature of the heat exchanger 34 will still not be at or above the temperature at which the cooking medium burns or smokes.

Note that the initial time period of the fryer protection mode may vary depending on the particular fryer design, heat exchanger design, cooking medium used, etc. It is to be clearly understood that the initial time period, and other exemplary time periods given hereinbelow, may vary without departing from the principles of the present invention. Such time periods may be easily determined for a particular fryer design, heat exchanger design, cooking medium, desired cooking temperature, etc. with minimal experimentation by one of ordinary skill in the art. Applicant contemplates that the microprocessor 68 may have stored in its nonvolatile memory (EEPROM) an initial time period that may be field programmed (changed) to suit a particular fryer/heat exchanger combination, etc. Devices such as dip switches (not shown) could also be used for setting the desired initial time period.

The fryer protection mode subroutine of the microprocessor 68 may also vary the initial time period, depending upon the temperature initially sensed by the probe 36. For example, if the probe 36 senses an initial temperature of 300° F. the subroutine may output a shorter initial time period than if the probe senses an initial temperature of 200° F. Thus, the initial time period may be inversely related to the temperature initially sensed by the probe 36.

Once the initial time period has elapsed, the fryer protection mode subroutine causes the microprocessor 68 to output an "on" signal to the driver 70 periodically, in order to maintain the surface temperature of the heat exchanger 34 at approximately the protection mode temperature. Using the example given above, an "on" signal may be output to the driver 70 for six seconds, followed by an "off" signal for forty-five seconds, etc. These time periods may be programmed as desired to maintain a desired heat exchanger 34 temperature. Additionally, these "on" and "off" time periods may be adjusted, depending upon the temperature initially sensed by the probe 36, and depending upon the temperature sensed by the probe during the fryer protection mode.

The fryer 30 may continue in the fryer protection mode indefinitely, without any danger of exceeding the ignition point of the cooking medium. Alternatively, the fryer protection mode may be automatically canceled when the temperature sensed by the probe 36 exceeds the upper limit (in the above example, 325° F.). As another alternative, the fryer protection mode may be canceled by depressing a switch 78 (see FIG. 3), thereby indicating to the microprocessor 78 that the fryer protection mode subroutine is to be exited and that the steady state mode is desired. In practice, an operator of the fryer 30 may depress switch 78 after the operator has filled the vat 32 with cooking medium 46 and is assured that it is in intimate contact with the heat exchanger 34.

Note that the switch 78, or another switch (not shown) connected to the microprocessor 68 may be depressed when the fryer 30 is initially activated, in order to indicate to the microprocessor that the fryer protection subroutine is to be run. In this configuration, when the fryer 30 is initially activated, the driver 70 will not receive an "on" signal from the microprocessor 68 unless the switch 78 (or other switch connected to the microprocessor) is depressed. Once the switch 78 is initially depressed, the microprocessor 68 may enter the fryer protection subroutine if the temperature detected by the probe is at or less than the upper limit (the fryer protection subroutine will not be run in any event if the temperature initially detected by the probe is greater than the upper limit). Thereafter, if the fryer protection subroutine is running, it may be exited by again depressing the switch 78 (or by depressing the switch 78 if another switch connected to the microprocessor was depressed in order to enter the fryer protection subroutine).

Programming of the microprocessor 68 to enable/disable the use (effect) of the fryer protection mode may be easily accomplished by one of ordinary skill in the art. The program is preferably stored in the microprocessor's nonvolatile memory (EPROM). Of course, variations in the microprocessor program may be made by one of ordinary skill in the art, beyond those described hereinabove, and those variations are encompassed by the principles of the present invention.

The foregoing detailed description is to be clearly understood as being given by way of illustration and example only, the spirit and scope of the present invention being limited solely by the appended claims.

What is claimed is:

1. A fryer of the type wherein food is immersed in a cooking medium heated to an elevated cooking temperature, the cooking medium being heated to the elevated cooking temperature after the fryer has been activated by connecting the fryer to an external power source, the fryer comprising:

a generally box-shaped vat;

a heat source disposed at least partially within said vat;

a temperature probe disposed at least partially within said vat;

a control circuit interconnected to said temperature probe, said control circuit having a fryer protection mode wherein said control circuit is capable of elevating a temperature of said heat source to a temperature less than a temperature at which the cooking medium burns, in response to activation of the fryer, said control circuit comprising a programmable microprocessor interconnected to said probe, and a driver interconnected between said microprocessor and said heat source, said driver being capable of causing said heat source temperature to be elevated in response to a signal transmitted from said microprocessor to said driver when said control circuit is in said fryer protection mode, said microprocessor being capable of receiving a temperature indication from said probe after the fryer is activated and transmitting said signal to said driver when said temperature indication is greater than an upper limit temperature, and said microprocessor being further capable of transmitting said signal to said driver when said temperature indication is less than said upper limit temperature for an initial time period, thereby elevating said heat source temperature to said temperature less than said temperature at which the cooking medium burns in said fryer protection mode of said control circuit; and a first switch interconnected to said microprocessor, said first switch being capable of preventing said control circuit from entering said fryer protection mode, thereby preventing said microprocessor from transmitting said signal to said driver when the fryer is activated and said probe temperature indication is less than said upper limit temperature, and said first switch being capable of permitting said control circuit to enter said fryer protection mode, thereby permitting said microprocessor to transmit said signal to said driver for said initial time period when said first switch is switched between open and closed positions thereof after the fryer is activated and when said probe temperature indication is less than said upper limit temperature.

2. The fryer according to claim 1, wherein said first switch is further capable of permitting said control circuit to leave said fryer protection mode when said first switch is switched between said open and closed positions and when said control circuit has entered said fryer protection mode.

3. A method of preventing overheating of a cooking medium disposed within a vat of a fryer in which a heat source and a temperature probe are installed, the method comprising the steps of:

providing a control having a fryer protection mode and a steady state mode;

interconnecting the control circuit to the heat source and the temperature probe;

providing a set point source for indicating a set point temperature for food to be cooked in the cooking medium;

interconnecting the set point source to the control circuit;

sensing an initial vat temperature with the probe upon initial activation of the fryer;

entering the fryer protection mode when the initial vat temperature is equal to or less than an upper limit temperature which is greater than a melting temperature of the cooking medium and greater than ambient temperature, wherein in the fryer protection mode:

the heat source is continuously activated for an initial time period, thereby elevating the heat source surface approximately to a protection mode temperature greater than the set point temperature, but less than the combustion temperature, then the heat source is periodically activated, thereby maintaining the heat source surface at approximately the protection mode temperature; and entering the steady state mode when the initial vat temperature is greater than the upper limit temperature, wherein in the steady state mode the heat source is periodically activated, thereby maintaining the cooking medium temperature at approximately the set point temperature.

4. The method according to claim 3, further comprising the step of varying the length of the initial time period in response to the initial vat temperature sensed by the temperature probe.

* * * * *